(12) United States Patent
Park et al.

(10) Patent No.: US 12,035,048 B2
(45) Date of Patent: Jul. 9, 2024

(54) FRONT IMAGE GENERATION DEVICE FOR HEAVY EQUIPMENT

(71) Applicant: WISE AUTOMOTIVE CORPORATION, Seoul (KR)

(72) Inventors: Jaehong Park, Seoul (KR); Jungpyo Lee, Seoul (KR)

(73) Assignee: WISE AUTOMOTIVE CORPORATION, Seoul (KR)

( * ) Notice: Subject to any disclaimer, the term of this patent is extended or adjusted under 35 U.S.C. 154(b) by 185 days.

(21) Appl. No.: 17/761,985

(22) PCT Filed: Sep. 18, 2020

(86) PCT No.: PCT/KR2020/012605
§ 371 (c)(1),
(2) Date: Mar. 18, 2022

(87) PCT Pub. No.: WO2021/054756
PCT Pub. Date: Mar. 25, 2021

(65) Prior Publication Data
US 2022/0329731 A1 Oct. 13, 2022

(30) Foreign Application Priority Data
Sep. 20, 2019 (KR) .......... 10-2019-0116070
Dec. 2, 2019 (KR) .......... 10-2019-0158373

(51) Int. Cl.
*H04N 23/90* (2023.01)
*H04N 5/265* (2006.01)
*H04N 23/698* (2023.01)

(52) U.S. Cl.
CPC .......... *H04N 23/698* (2023.01); *H04N 5/265* (2013.01); *H04N 23/90* (2023.01)

(58) Field of Classification Search
None
See application file for complete search history.

(56) References Cited

U.S. PATENT DOCUMENTS 6,411,742 B1   6/2002   Peterson
10,435,868 B2  10/2019  Tsuji et al.
(Continued)

FOREIGN PATENT DOCUMENTS

CN   107532410 A    1/2018
JP   2003-533797 A  11/2003
(Continued)

OTHER PUBLICATIONS

KR Office Action dated Sep. 22, 2020 as received in Application No. 10-2019-0158375.
(Continued)

*Primary Examiner* — Eileen M Adams
(74) *Attorney, Agent, or Firm* — Maschoff Brennan

(57) ABSTRACT

Disclosed is a front image generation device for heavy equipment, which generates a composite front image by using two or more cameras. The front image generation device includes: an upper camera disposed on a wheel loader and configured to generate a first front image; a lower camera disposed on the wheel loader and configured to generate a second front image; an image processor configured to generate a composite front image by compositing the first front image and the second front image; and a display configured to display the composite front image generated by the image processor.

19 Claims, 9 Drawing Sheets

(56) References Cited

U.S. PATENT DOCUMENTS

| | | | | |
|---|---|---|---|---|
| 2013/0250114 | A1* | 9/2013 | Lu | B60R 1/00 |
| | | | | 348/148 |
| 2014/0007222 | A1* | 1/2014 | Qureshi | H04L 67/10 |
| | | | | 726/16 |
| 2016/0273195 | A1 | 9/2016 | Chang | |
| 2017/0028919 | A1 | 2/2017 | Izumikawa et al. | |
| 2017/0284069 | A1 | 10/2017 | Machida et al. | |
| 2017/0310937 | A1* | 10/2017 | Wada | G06T 5/50 |
| 2018/0222390 | A1* | 8/2018 | Imaizumi | E02F 9/261 |
| 2019/0042858 | A1 | 2/2019 | Kowatari et al. | |

FOREIGN PATENT DOCUMENTS

| KR | 10-2011-0067683 A | 6/2011 |
|---|---|---|
| KR | 10-2013-0069912 A | 6/2013 |
| KR | 10-1611427 B1 | 4/2016 |
| KR | 10-2016-0146698 A | 12/2016 |
| KR | 10-1766711 B1 | 8/2017 |
| KR | 10-2018-0078970 A | 7/2018 |
| KR | 10-1895830 B1 | 9/2018 |
| KR | 10-2018-0065758 A | 11/2021 |

OTHER PUBLICATIONS

KR Office Action dated Sep. 22, 2020 as received in Application No. 10-2019-0158373.
KR Office Action dated Sep. 22, 2020 as received in Application No. 10-2019-0158374.
KR Final Office Action dated Jan. 11, 2021 as received in Application No. 10-2019-0158375.
KR Office Action dated Apr. 23, 2021 as received in Application No. 10-2019-0158375.
KR Final Office Action dated Oct. 28, 2021 as received in Application No. 10-2019-0158375.
Chinese Office Action issued in corresponding application No. 202080064506.2, dated Jan. 4, 2024.

* cited by examiner

[FIG. 1]
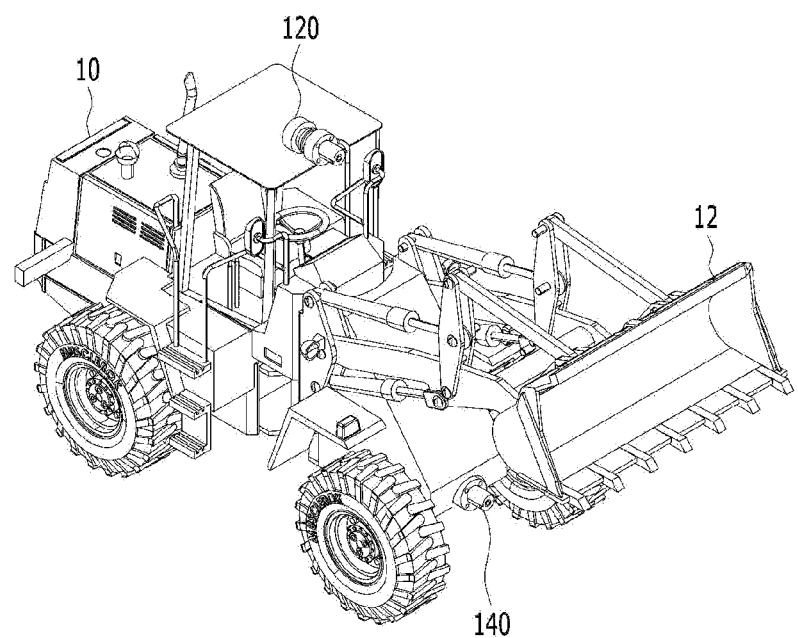
[FIG. 2]
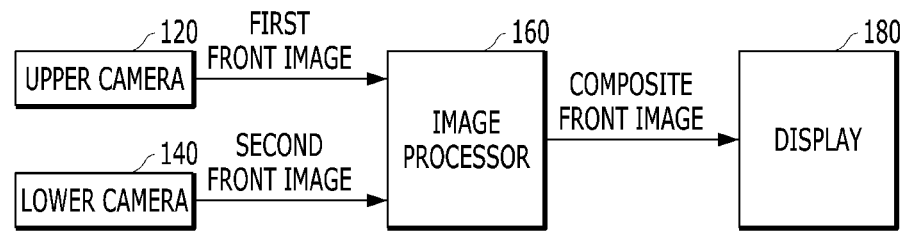

[FIG. 3]
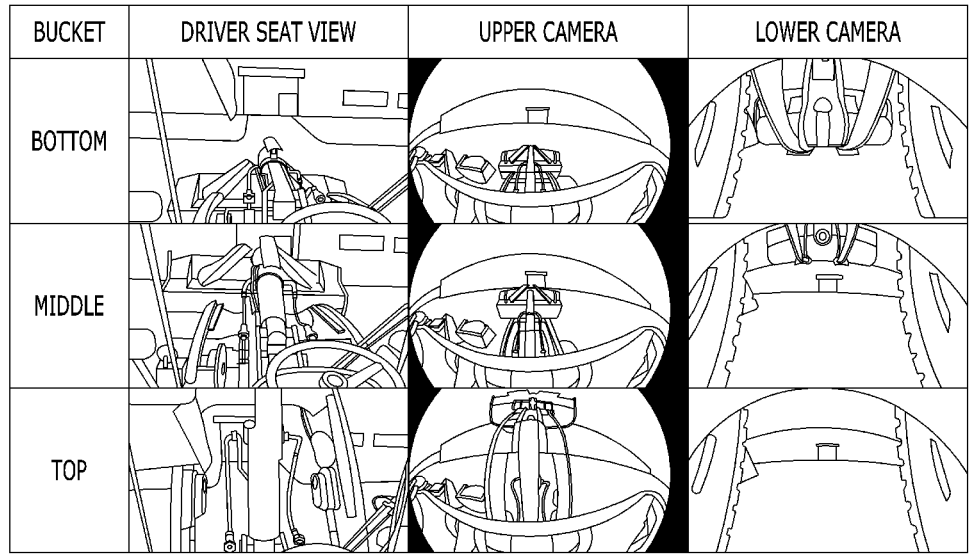
[FIG. 4]
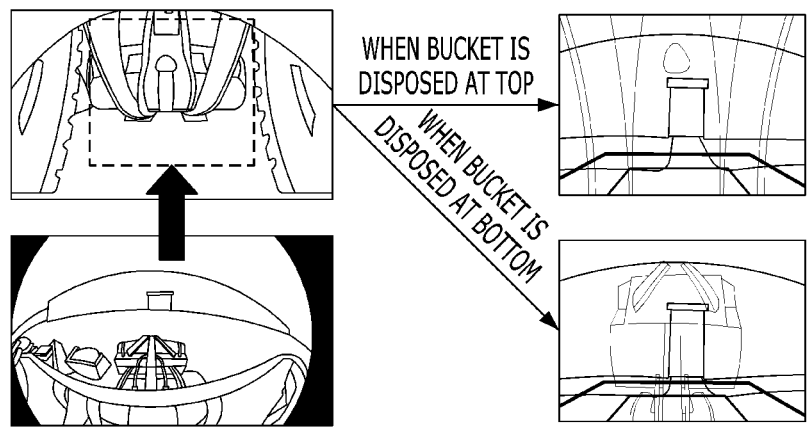

[FIG. 5]
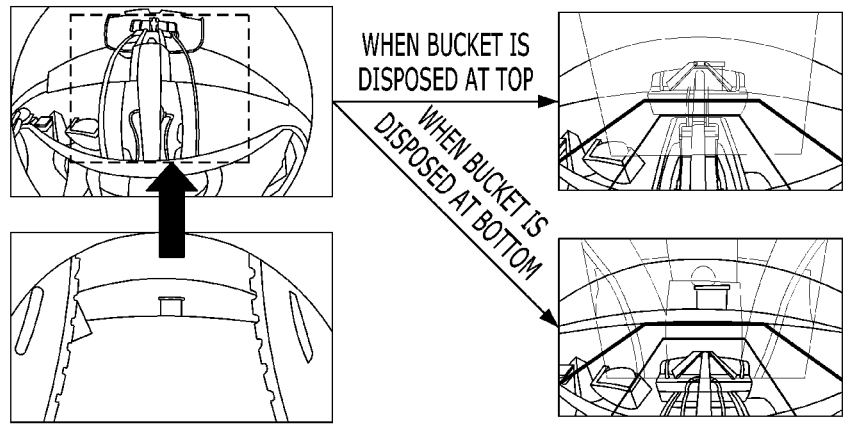
[FIG. 6]
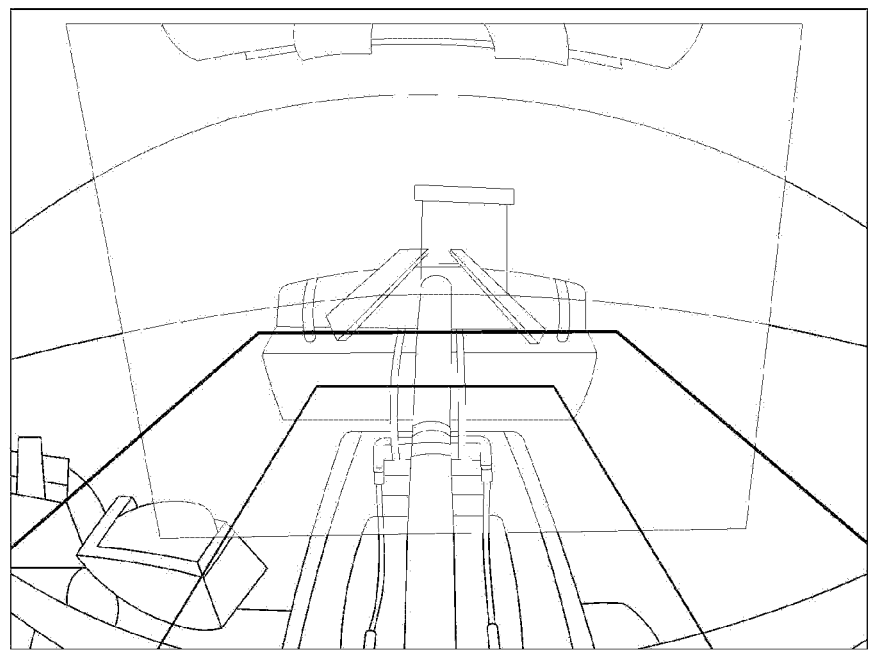

[FIG. 7]
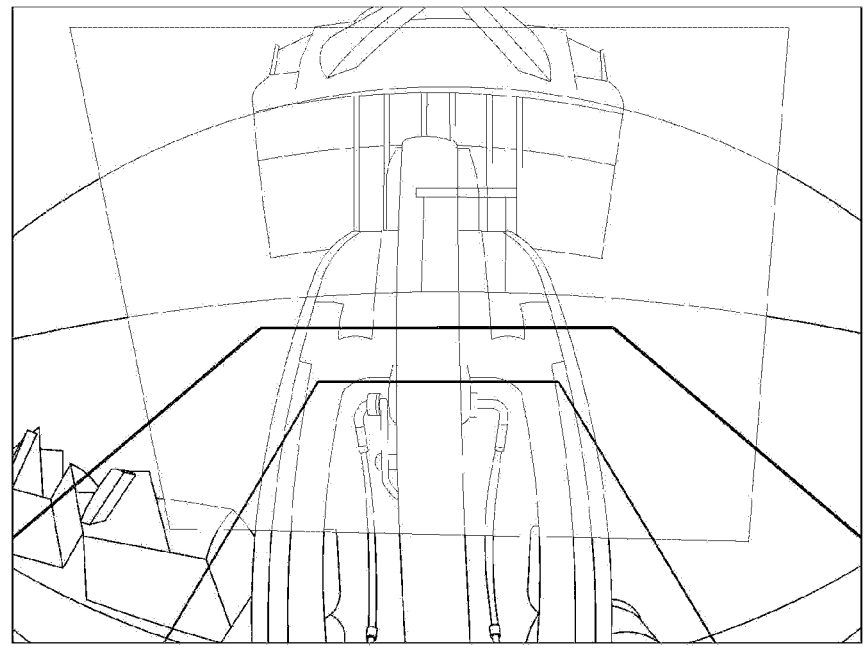
[FIG. 8]
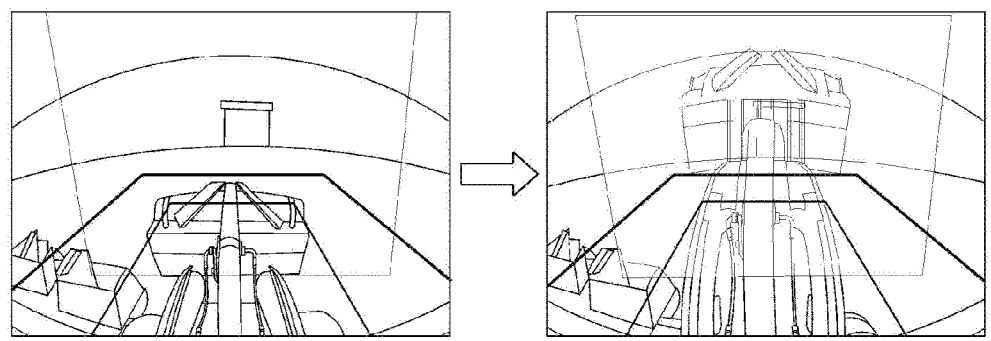

[FIG. 9]
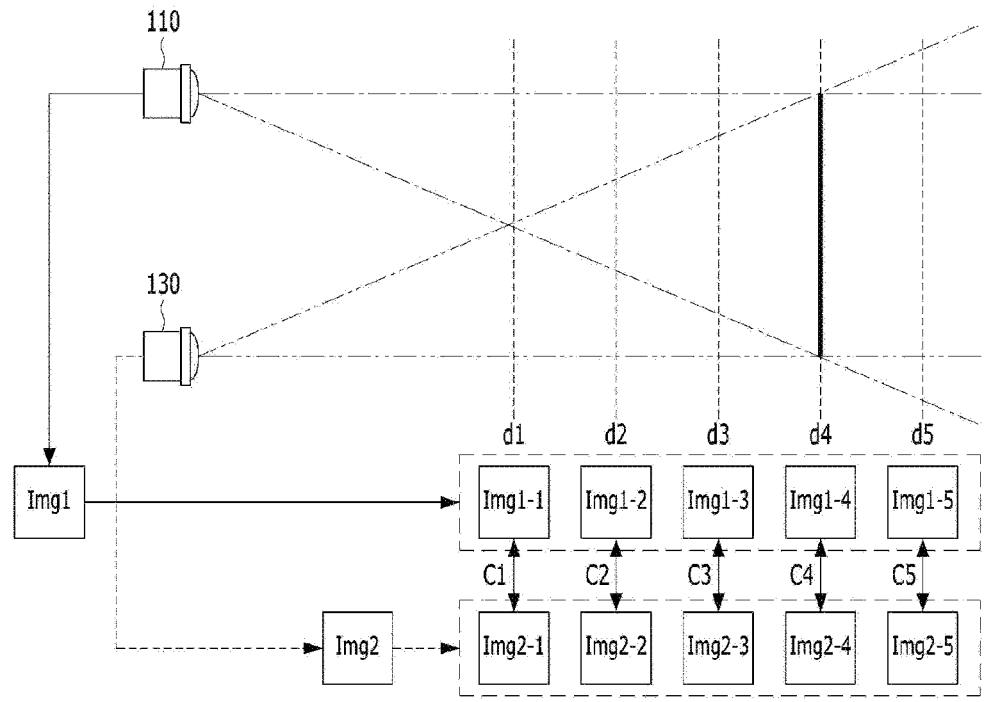
[FIG. 10]
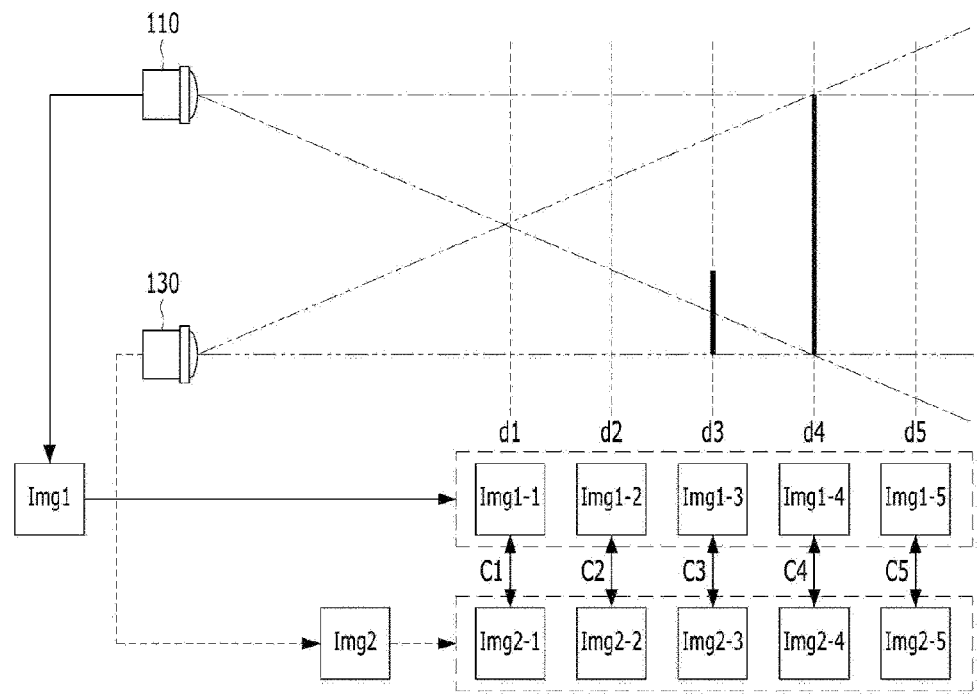

[FIG. 11]
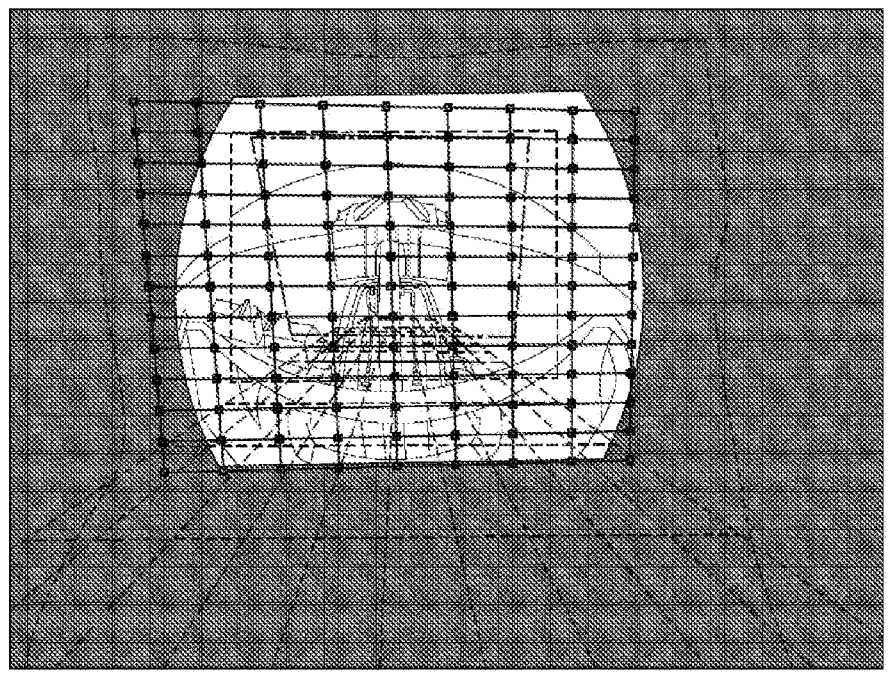
[FIG. 12]
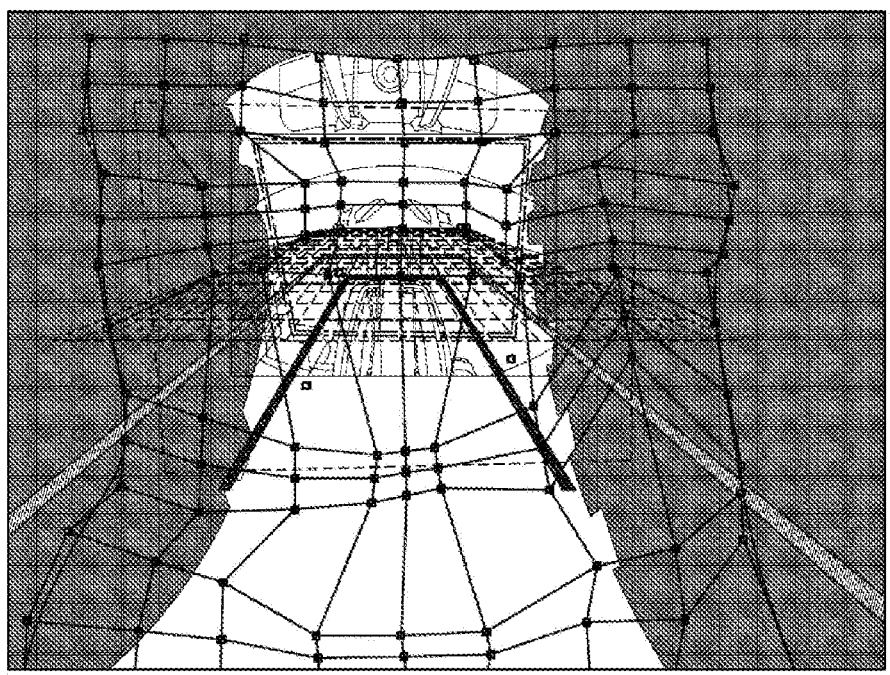

[FIG. 13]
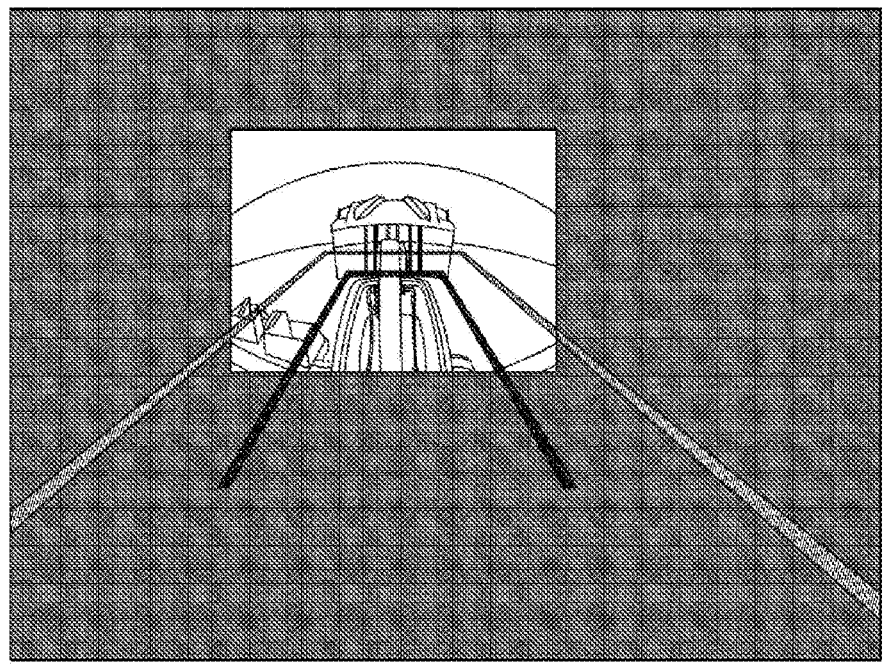

[FIG. 14]
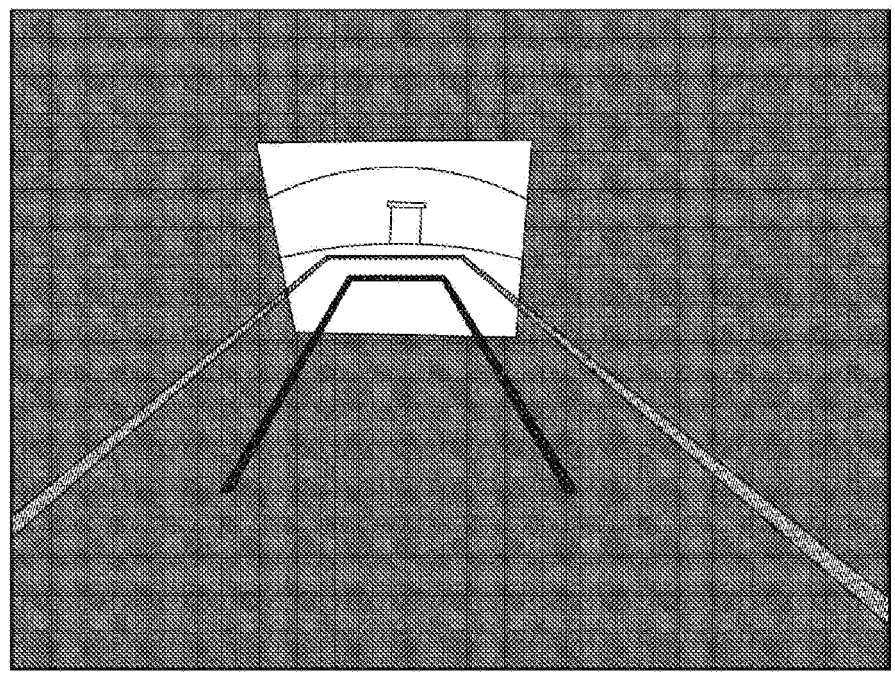

[FIG. 15]
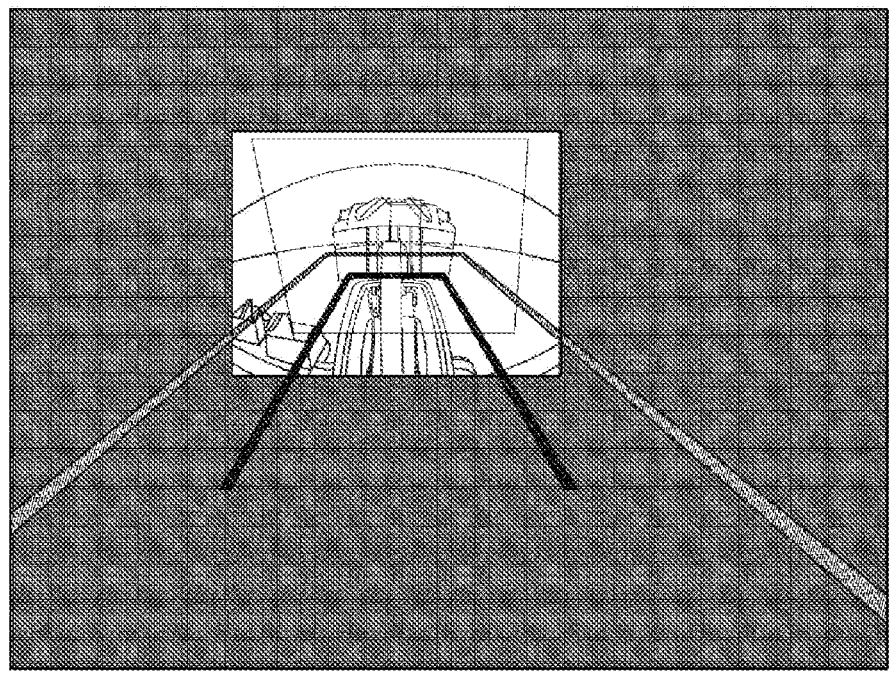

FRONT IMAGE GENERATION DEVICE FOR HEAVY EQUIPMENT

TECHNICAL FIELD

The present disclosure relates to a front image generation device for heavy equipment, and more particularly, to a front image generation device for heavy equipment, which generates a front image for securing a front view in heavy equipment such as a wheel loader in which it is difficult to check a front area during a work.

BACKGROUND ART

Heavy equipment is used for various works in construction sites, and may include a wheel loader, an excavator and the like, for example. In many cases, a large-sized part is disposed in front of a driver in the heavy equipment. Thus, during a work, the driver's front view is blocked by the large-sized part. For example, during a work in which a wheel loader is used, a driver's front view is blocked by a bucket which is lifted/lowered at the front of the wheel loader.

As such, when the heavy equipment is used, the driver's front view is blocked. Thus, the work efficiency is degraded, and various types of safety accidents are highly likely to occur.

SUMMARY OF INVENTION

Technical Problem

The present disclosure is proposed to solve the above conventional problem, and an object of the present disclosure is to provide a front image generation device for heavy equipment, which generates a front image of heavy equipment by compositing images taken by a plurality of cameras disposed on the heavy equipment.

Solution to Problem

To achieve the object, a front image generation device for heavy equipment, which generates a composite front image by using two or more cameras, according to an exemplary embodiment of the present disclosure includes: an upper camera disposed on a wheel loader and configured to generate a first front image; a lower camera disposed on the wheel loader and configured to generate a second front image; an image processor configured to generate a composite front image by compositing the first front image and the second front image; and a display configured to display the composite front image generated by the image processor.

The image processor may generate a composite front image by compositing the first and second front images, compositing a part of the second front image into the first front image, or compositing a part of the first front image into the second front image. At this time, the image processor may generate the composite front image in which the bucket of the wheel loader is translucently represented.

The image processor may receive the position of a bucket from an external sensor, or detect the position of the bucket of the wheel loader through image processing, and then may set different weights to the first and second front images, depending on the position of the bucket of the wheel loader. When the bucket is located at the bottom, the image processor may set a higher weight than the second front image to the first front image, and when the bucket is located at the top, the image processor may set a higher weight than the first front image to the second front image.

The image processor may generate the composite front image in which a common area between the first and second front images is represented more brightly than the other area, and the bucket is represented in an opaque state until the bucket blocks the target, and represented in a translucent or transparent state from the point of time that the bucket blocks the target.

In order to generate the composite front image, the image processor needs to set a projection plane (or projection space), and composite images taken by a plurality of cameras onto the set projection plane. As a method for setting the projection plane, the image processor may set the projection plane by checking distance information and posture information on the basis of information acquired from various sensors, a controller and the like. Alternatively, the image processor may set the projection plane by analyzing feature points of the taken front images, or analyzing curved surface information of the taken front images. Furthermore, the image processor may set the projection plane by combining two or more of such methods.

Since all or part of each of images taken by a plurality of cameras may have different luminance, transparency, or brightness, the image processor needs to convert the luminance, transparency, or brightness of all or part of each of the images and composite the images, when or after projecting the images taken by the plurality of cameras onto a preset projection plane or projection space, in order to minimize a sense of difference in the composite front image.

Examples of the method for compositing front images will be described as follows. When an object is located at a predetermined distance, the image processor may set a plane at the predetermined distance to a projection plane, and project (convert) camera images at an angle corresponding to the projection plane, such that images taken by a plurality of cameras are matched with one another on the projection plane.

Furthermore, when a plurality of objects are located at different distances, the image processor may divide an image into areas occupied by the respective objects, and perform a composition operation on a projection plane set to the distance to the object corresponding to each of the divided areas, in order to generate a composite front image. Furthermore, when a plurality of objects are located at different distances, the image processor may aggregate distance information to the respective objects, set a 3D projection plane on this information, and composite images taken with respect to projection planes of the 3D projection plane, thereby generating a composite front image. In the following descriptions, the projection plane may include a 3D projection plane.

When setting a projection plane to generate a composite front image, the image processor may generate the projection plane through a method of extracting feature points of images taken by a plurality of cameras, extracting matched feature points by evaluating the coincidence for the same object, and optimizing the projection plane by matching the matched feature points with each other, and then generate a composite front image. When this method is used, the plurality of images are matched and composited while portions of the images are extended or reduced.

The process of extracting and matching the feature points may bear a burden on the image processor. Thus, the image processor may set feature points in images taken by a plurality of cameras in advance, and set information on how the set feature points are matched in the respective images.

In this method, the image processor may generate a composite front image such that the matched feature points in the images taken by the respective cameras coincide with each other on the basis of the feature points of the respective images. Therefore, the front images are composited while portions of the images are extended or reduced. Since the feature points and the matching information are set in advance, the burden on the image processor may be reduced, and distortions of the respective images taken by the plurality of cameras may be partially adjusted to generate the composite front image. An example in which matching points are set in the respective images will be described below with reference to FIGS. 11 and 12.

The image processor may convert the first front image and the second front image into a first projection image and a second projection image on the basis of distance information, and generate a composite front image by compositing the first and second projection images. The image processor may set a plurality of random distances, convert the first front image and the second front image into first projection images and second projection images on the basis of the respective random distances, calculates the coincidences between the first projection images and the second projection images at the respective random distances, and set the random distance, at which the highest coincidence is detected, to distance information, or utilize distance information inputted from the outside. At this time, when the position of the wheel loader is changed, the image processor may reset the distance information.

The image processor may divide the first front image into a plurality of areas, and generate a first projection image by converting the plurality of areas into a projection image on the basis of different pieces of distance information for the respective areas. Furthermore, the image processor may divide the second front image into a plurality of areas, and generate a second projection image by converting the plurality of areas into a projection image on the basis of different pieces of distance information for the respective areas.

The image processor may utilize distance information inputted from the outside, set distance information on the basis of the feature points set in the first and second front images, and detect areas, which are used for composition, from the first and second front images on the basis of the feature points set in the first and second front images.

Advantageous Effects

According to the present disclosure, the front image generation device for heavy equipment may composite front images taken at the top and bottom of a wheel loader, and display the composite front image, thereby minimizing a blind zone formed by a bucket of the wheel loader.

Furthermore, the front image generation device for heavy equipment may translucently display the bucket in the composite front image, thereby preventing a driver's front view from being blocked by the bucket.

BRIEF DESCRIPTION OF DRAWINGS

FIGS. 1 and 2 are diagrams for describing a front image generation device for heavy equipment in accordance with an embodiment of the present disclosure.

FIGS. 3 to 10 are diagrams for describing an image processor of FIG. 2.

FIGS. 11 to 15 are diagrams for describing a process in which the image processor of FIG. 2 generates a composite front image by using feature points.

DESCRIPTION OF EMBODIMENTS

Hereinafter, the most preferred exemplary embodiments of the present disclosure will be described with reference to the accompanying drawings in order to specifically describe the exemplary embodiments such that those skilled in the art to which the present disclosure pertains may easily implement the technical spirit of the present disclosure. First, in adding reference numerals to the components of each drawing, it should be noted that the same components have the same reference numerals as much as possible even if they are illustrated in different drawings. Further, in describing the present disclosure, when it is determined that the detailed description of the related well-known configuration or function may obscure the gist of the present disclosure, the detailed description thereof will be omitted.

Referring to FIG. 1, a front image generation device for heavy equipment in accordance with an embodiment of the present disclosure is a device for generating a front image of a wheel loader 10, and includes an upper camera 120 disposed at the top of the wheel loader 10 and a lower camera 140 disposed at the bottom of the wheel loader 10. For example, the upper camera 120 is disposed on the roof of a driver seat in the wheel loader 10, and the lower camera 140 is disposed at the front bottom of a vehicle body of the wheel loader 10.

For convenience of description, FIG. 1 illustrates that the upper camera 120 and the lower camera 140 are disposed at the top and bottom of the wheel loader 10. However, the present disclosure is not limited thereto, but the upper camera 120 and the lower camera 140 may be disposed at any positions where the cameras can take front images. The following descriptions will be focused on two cameras, i.e. the upper camera 120 and the lower camera 140. However, the present disclosure is not limited thereto, but it should be interpreted that three or more cameras may be used to generate an image. For example, two or more cameras mounted in front of a driver seat may be combined with the upper camera 120 and the lower camera 140, in order to composite images. Furthermore, any cameras such as a camera mounted on an arm or bucket may be utilized to composite images, as long as the cameras can each take even a part of a front image.

The upper camera 120 generates a first front image by taking an image of a front area of the wheel loader 10 from the top of the wheel loader 10, and the lower camera 140 generates a second front image by taking an image of the front area of the wheel loader 10 from the bottom of the wheel loader 10.

Referring to FIG. 2, the front image generation device for heavy equipment further includes an image processor 160 configured to generate a composite front image by compositing the first and second front images, and a display 180 configured to display the composite front image provided by the image processor 160.

The image processor 160 generates a composite front image by compositing the images taken by the upper camera 120 and the lower camera 140. That is, the image processor 160 generates the composite front image by compositing the first front image taken by the upper camera 120 and the second front image taken by the lower camera 140. At this time, the image processor 160 generates the composite image in which a bucket 12 included in the image is translucently represented.

Through this operation, the image processor 160 provides a driver with the front image which is not blocked by the bucket 12 and the composite front image through which the position and operation state of the bucket 12 can be checked.

Referring to FIG. 3, when the bucket 12 is located at the bottom, a front target is not blocked by the bucket 12 in a driver seat view and the first front image, but the entire front target is blocked by the bucket 12 and wheels of the wheel loader 10 in the second front image.

When the bucket 12 is located at the middle, a portion of the lower region of the front target is blocked by the bucket 12 in the driver seat view and the first front image, and a portion of the upper region of the front target is blocked by the bucket 12 in the second front image.

When the bucket 12 is located at the top, most of the front target is blocked by the bucket 12 in the driver seat view and the first front image, and the front target is not blocked by the bucket 12 in the second front image.

In order to prevent the target from being blocked by the bucket 12, the image processor 160 generates the composite front image by compositing the first and second front images. The image processor 160 composites the first and second front images taken by the upper and lower cameras 120 and 140 at the same point of time, thereby generating a composite front image with no blind zone in the front view. At this time, the image processor 160 generates the composite front image in which components of the wheel loader 10 such as the bucket 12 and the arm, included in the composite front image, are translucently represented.

The image processor 160 generates a composite front image by compositing a portion of the first front image into the second front image. That is, as illustrated in FIG. 4, the image processor 160 sets the second front image taken by the lower camera 140 to the background, and composites the second front image and a portion of the first front image taken by the upper camera 120 at the same point of time as the second front image, in order to generate the composite front image. At this time, the front view secured in the composite front image is partially limited by the front wheels of the wheel loader 10, but may be enough to represent the front blind zone. Since the wheels may be included in the second front image, the image processor 160 may composite the first and second front images such that the region including the wheels is transparently represented through the first front image.

The image processor 160 generates a composite front image by compositing a portion of the second front image into the first front image. That is, as illustrated in FIG. 5, the image processor 160 sets the first front image taken by the upper camera 120 to the background, and composites the first front image and a portion of the second front image taken by the lower camera 140 at the same point of time as the first front image, in order to generate the composite front image. At this time, since the composite front image includes the first front image set to the background thereof, the composite front image has a wider view angle than the composite front image including the second front image set to the background thereof.

The image processor 160 may composite the first and second front images by applying different weights to the first and second front images according to the position of the bucket 12, when generating the composite front image. The image processor 160 applies a higher weight to the first front image when the bucket 12 is located at the bottom, and applies a higher weight to the second front image when the bucket 12 is located at the top.

The image processor 160 may composite the second front image into the first front image such that a common area is represented with different color and brightness from the other area. For example, referring to FIG. 6, the image processor 160 may composite the second front image into the first front image such that the common area is represented more brightly than the other area. That is, the image processor 160 generates the composite front image in which the common area of the first front image, with which the second front image is composited, is represented more brightly than the other area. In other words, the image processor 160 generates the composite front image in which the area where the first and second front images are composited is brightly represented, and the area of the first front image, with which the second front image is not composited, is darkly represented.

Referring to FIG. 7, the image processor 160 may adjust the color and transparency of the composite front image such that the color and transparency of the common area are not different from those of the other area, in order to minimize a sense of difference in the composite front image.

Referring to FIG. 8, the image processor 160 may generates the composite front image that represents the bucket 12 in an opaque state until the bucket 12 blocks the target, and represents the bucket 12 in a translucent or transparent state from the point of time that the bucket 12 blocks the target.

The image processor 160 sets the transparencies of the first and second front images to 0.5, and then composites the first and second front images, in order to generate the composite front image. The image processor 160 may dynamically adjust the transparencies of the first and second front images according to the position of the bucket 12 or the arm connected to the bucket 12, and then composite the first and second front images, in order to generate the composite front image.

For example, when the bucket 12 is located at the bottom, the image processor 160 sets the weight of the first front image to a higher weight than the weight of the second front image. That is, when the bucket 12 is located at the bottom, the second front image has many blind zones. Thus, the image processor 160 sets the weight of the first front image having relatively few blind zones to a higher weight. The image processor 160 applies a higher weight to the first front image taken by the upper camera 120, in order to set the transparency of the first front image to a lower transparency than the second front image, and applies a lower weight to the second front image taken by the lower camera 140, in order to set the transparency of the second front image to a higher transparency than the first front image.

For another example, when the bucket 12 is located at the middle or top, the image processor 160 sets the weight of the second front image to a higher weight than the weight of the first front image. That is, when the bucket 12 is located at the top, the first front image has many blind zones. Thus, the image processor 160 sets the weight of the second front image having relatively few blind zones a higher weight. The image processor 160 applies a higher weight to the second front image taken by the lower camera 140, in order to set the transparency of the second front image to a lower transparency than the first front image, and applies a lower weight to the first front image taken by the upper camera 120, in order to set the transparency of the first front image to a higher transparency than the second front image.

The image processor 160 may generate a composite front image by compositing the first front image and the second front image one-to-one. That is, the image processor 160 converts the first and second front images into plane or curved images on a screen (i.e. projection plane) at a predetermined distance, and then composites the plane or curved images, in order to generate the composite front image.

The image processor 160 may match the first and second front images by extending or reducing the two images without using the projection plane, and then composite the matched front images, in order to generate the composite front image.

The image processor 160 requires distance information in order to composite the first and second front images one-to-one. That is, the image processor 160 converts the first and second front images into plane images by using the distances to the projection plane from where the first and second front images are taken, and composites the plane images, in order to generate the composite front image.

The image processor 160 may acquire the distance information from the first and second front images. That is, the image processor 160 sets a plurality of random distances from the cameras to the projection plane. The image processor 160 converts the first front image into a first projection image on the basis of each of the random distances. The image processor 160 converts the second front image into a second projection image on the basis of each of the random distances. The image processor 160 calculates a coincidence (similarity) by comparing the first and second projection images which are acquired on the basis of the same random distance. The image processor 160 compares the coincidences acquired at the plurality of random distances, and sets the random distance, at which the highest coincidence is acquired, to distance information for composition.

For this operation, the image processor 160 sets the distance information when the wheel loader 10 is stopped. The image processor 160 generates the first and second projection images at each of the random distances. The image processor 160 sets the random distance, at which the coincidence between the first and second projection images is highest, to the distance information. In the present embodiment, it has been described that the image processor 160 sets the distance information when the wheel loader 10 is stopped. However, the present disclosure is not limited thereto, but the image processor 160 may set the distance information even while the wheel loader 10 is operating.

For example, FIG. 9 is based on the assumption that the image processor 160 sets first to fifth random distances d1 to d5, and a target is located at the fourth random distance d4.

The image processor 160 generates a first-first projection image img1-1 and a second-first projection image img2-1 by converting a first front image img1 and a second front image img2 on the basis of the first random distance d1. The image processor 160 calculates a coincidence C1 between the first-first projection image img1-1 and the second-first projection image img2-1.

The image processor 160 generates a first-second projection image img1-2 and a second-second projection image img2-2 by converting the first front image img1 and the second front image img2 on the basis of the second random distance d2. The image processor 160 calculates a coincidence C2 between the first-second projection image img1-2 and the second-second projection image img2-2.

The image processor 160 generates a first-third projection image img1-3 and a second-third projection image img2-3 by converting the first front image img1 and the second front image img2 on the basis of the third random distance d3. The image processor 160 calculates a coincidence C3 between the first-third projection image img1-3 and the second-third projection image img2-3.

The image processor 160 generates a first-fourth projection image img1-4 and a second-fourth projection image img2-4 by converting the first front image img1 and the second front image img2 on the basis of the fourth random distance d4. The image processor 160 calculates a coincidence C4 between the first-fourth projection image img1-4 and the second-fourth projection image img2-4.

The image processor 160 generates a first-fifth projection image img1-5 and a second-fifth projection image img2-5 by converting the first front image img1 and the second front image img2 on the basis of the fifth random distance d5. The image processor 160 calculates a coincidence C5 between the first-fifth projection image img1-5 and the second-fifth projection image img2-5.

The image processor 160 detects the random distance having the highest coincidence by comparing the coincidences C1 to C5 at the first to fifth random distances d1 to d5, and sets the detected random distance to the distance information. In FIG. 9, the highest coincidence C4 is detected at the fourth random distance d4 where the target is actually located. Thus, the image processor 160 sets the fourth random distance d4 to the distance information.

When the position of the wheel loader 10 is not changed, the image processor 160 converts the first and second front images at a subsequent point of time into projection images by using preset distance information. The image processor 160 may reset the distance information when the position of the wheel loader 10 is changed, and set distance information for each point of time in order to raise the accuracy.

The image processor 160 may convert the first and second front images by using the distance information manually set by a user, and then composite the converted images, in order to generate a composite front image.

The image processor 160 may acquire the distance information through alignment between the upper camera 120 and the lower camera 140. That is, the image processor 160 may acquire the distance information through triangulation using the position information of the upper and lower cameras 120 and 140. The image processor 160 may acquire the distance information through a lidar, a 3D laser scanner, a TOF (Time-Of-Flight) depth camera, or an ultrasonic camera.

When a plurality of targets are located at different random distances, the image processor 160 may set distance information for each area of an image by using a plurality of random distances. The image processor 160 converts the first and second front images into projection images on the basis of different pieces of distance information, which are set for an upper image area and a lower image area, and generates a composite front image by compositing the projection images.

For example, FIG. 10 is based on the assumption that a first target is located at the fourth random distance d4, and a second target is located at the third random distance d3. The image processor 160 converts a first front image img1 and a second front image img2 into projection images img1-1 to img1-5 and img2-1 to img2-5 on the basis of the respective random distances.

For the first target, the highest coincidence is calculated at the fourth random distance d4, and for the second target, the highest coincidence is calculated at the third random distance d3. Therefore, the image processor 160 sets the third random distance d3 to the distance information in the case of the lower image area onto which the second target is projected, and sets the fourth random distance d4 to the distance information in the case of the other image area except the lower image area.

The image processor 160 generates a first projection image by converting a lower image area of the first front image on the basis of the third random distance d3, and converting the other image area of the first front image on the basis of the fourth random distance d4.

The image processor 160 generates a second projection image by converting a lower image area of the second front image on the basis of the third random distance d3, and converting the other image area of the second front image on the basis of the fourth random distance d4.

The image processor 160 generates a composite front image by compositing the first and second projection images acquired through the two pieces of distance information.

Referring to FIGS. 11 to 15, the image processor 160 converts the first front image and the second front image into the first projection image and the second projection image by using the distance information. The image processor 160 sets feature points in the first and second front images, and sets distance information by using the feature points matched with both of the first and second front images. The image processor 160 detects an area which is to be used for composition, by using the feature points set in the first and second front images. The image processor 160 generates the first projection image by converting the area detected from the first front image on the basis of the distance information, and generates the second projection image by converting the area detected from the second front image on the basis of the distance information. The image processor 160 generates a composite projection image by compositing the first projection image and the second projection image. At this time, the image processor 160 sets the transparencies of the overlapping areas of the first and second projection images when generating the composite projection image, and generates a composite front image in which the bucket 12 is represented in a translucent state. The image processor 160 may generate a composite front image in which the overlapping areas of the first and second projection images are processed more brightly than non-overlapping areas.

Although the preferred exemplary embodiments of the present disclosure have been described above, it is understood that the present disclosure may be modified in various forms, and those skilled in the art may practice various modified examples and changed examples without departing from the scope of the claims of the present disclosure.

The invention claimed is:

1. A front image generation device for heavy equipment, which generates a composite front image by using two or more cameras, the front image generation device comprising:
an upper camera disposed on a wheel loader and configured to generate a first front image;
a lower camera disposed on the wheel loader and configured to generate a second front image; and
an image processor configured to generate a composite front image by compositing the first front image and the second front image,
wherein the image processor sets different weights to the first front image and the second front image, depending on the position of a bucket of the wheel loader.

2. The front image generation device of claim 1, wherein the image processor generates a composite front image by compositing all or part of the second front image into the first front image.

3. The front image generation device of claim 1, wherein the image processor generates a composite front image by compositing all or part of the first front image into the second front image.

4. The front image generation device of claim 1, wherein the image processor generates a composite front image in which at least one of the bucket and an arm of the wheel loader is represented in a translucent state.

5. The front image generation device of claim 1, wherein the image processor generates the composite front image representing a bucket of the wheel loader in an opaque state until the bucket blocks a target and representing the bucket in a translucent state from a point of time that the bucket blocks the target.

6. The front image generation device of claim 1, wherein the image processor matches and composites a first projection image and a second projection image.

7. The front image generation device of claim 1, wherein the image processor sets distance information on the basis of feature points set in the first and second front images.

8. The front image generation device of claim 7, wherein the image processor detects an area, which is to be used for composition, from the first and second front images on the basis of the feature points set in the first and second front images.

9. The front image generation device of claim 1, wherein when a plurality of objects are located at different distances, the image processor sets a 3D projection plane on the basis of distance information of the respective objects, and composites images for the respective projection planes of the 3D projection plane.

10. The front image generation device of claim 1, wherein the image processor composites a plurality of images by extending or reducing portions of the respective images on the basis of feature points of the respective images.

11. The front image generation device of claim 10, wherein the feature points are set for each of the images in advance.

12. A front image generation device for heavy equipment, which generates a composite front image by using two or more cameras, the front image generation device comprising:
an upper camera disposed on a wheel loader and configured to generate a first front image;
a lower camera disposed on the wheel loader and configured to generate a second front image; and
an image processor configured to generate a composite front image by compositing the first front image and the second front image,
wherein the image processor converts the first front image and the second front image into a first projection image and a second projection image, respectively, on the basis of distance information, and generates a composite front image by compositing the first and second projection images.

13. The front image generation device of claim 12, wherein the image processor sets a plurality of random distances, converts the first front image and the second front image into first projection images and second projection images on the basis of the respective random distances, calculates the coincidences between the first projection images and the second projection images at the respective random distances, and sets the random distance, at which the highest coincidence is detected, to distance information.

14. The front image generation device of claim 13, wherein the image processor sets a random distance, inputted through an external sensor or input device, to distance information.

15. The front image generation device of claim 13, wherein the image processor resets the distance information when the position of the wheel loader is changed.

16. The front image generation device of claim 15, wherein the image processor divides the first front image into a plurality of areas, and generates a first projection image by converting the plurality of areas into a projection image on the basis of different pieces of distance information for the respective areas, and
   divides the second front image into a plurality of areas, and generates a second projection image by converting the plurality of areas into a projection image on the basis of different pieces of distance information for the respective areas.

17. The front image generation device of claim 12, wherein the image processor sets a projection plane or projection space to convert the first and second front images into the first and second projection images.

18. The front image generation device of claim 17, wherein the image processor identifies distance information and posture information by using information acquired from a sensor or a controller, and sets the projection plane or the projection space.

19. The front image generation device of claim 17, wherein the image processor sets a projection plane by analyzing feature point information and/or curved plane information of a taken image.

* * * * *